(12) United States Patent
Gomez (10) Patent No.: US 6,475,653 B1
(45) Date of Patent: Nov. 5, 2002

(54) NON DIFFUSION FUEL CELL AND A PROCESS OF USING THE FUEL CELL

(75) Inventor: Rodolfo Mesina Gomez, Adelaide (AU)

(73) Assignee: RMG Services Pty Ltd, Adelaide (AU)

( * ) Notice: Subject to any disclaimer, the term of this patent is extended or adjusted under 35 U.S.C. 154(b) by 0 days.

(21) Appl. No.: 09/486,602

(22) PCT Filed: Aug. 27, 1998

(86) PCT No.: PCT/AU98/00693

§ 371 (c)(1),
(2), (4) Date: Mar. 1, 2000

(87) PCT Pub. No.: WO99/12220

PCT Pub. Date: Mar. 11, 1999

(30) Foreign Application Priority Data

| Sep. 1, 1997 | (AU) | ............................................... | PO8848 |
| Sep. 8, 1997 | (AU) | ............................................... | PO9016 |
| Oct. 27, 1997 | (AU) | ............................................... | PO9982 |
| Oct. 30, 1997 | (AU) | ............................................... | PP0069 |
| Nov. 21, 1997 | (AU) | ............................................... | PP0458 |
| Dec. 2, 1997 | (AU) | ............................................... | PP0658 |
| Dec. 30, 1997 | (AU) | ............................................... | PP1158 |

(51) Int. Cl.$^7$ ............................................... H01M 8/04
(52) U.S. Cl. ............................. 429/15; 429/51; 429/70; 429/105
(58) Field of Search ...................... 429/14, 15, 17–19, 429/34, 38, 39, 46, 51, 70, 105

(56) References Cited

U.S. PATENT DOCUMENTS

| 4,529,670 A | | 7/1985 | Findl |
| 5,366,824 A | | 11/1994 | Nozaki et al. |
| 5,945,231 A | * | 8/1999 | Narayanan et al. ........... 429/30 |

FOREIGN PATENT DOCUMENTS

| JP | 61-22574 | 1/1986 |
| JP | 61-22575 | 1/1986 |
| JP | 63-24565 | 2/1988 |
| WO | 90/11625 | 10/1990 |
| WO | 98/06145 | 2/1998 |

* cited by examiner

Primary Examiner—Stephen Kalafut
Assistant Examiner—Susy Tsang-Foster
(74) Attorney, Agent, or Firm—Crowell & Moring LLP (57) ABSTRACT

A fuel cell having an anode immersed in an electrolyte in an anode tank, and a cathode immersed in the electrolyte in the cathode tank, and the anode and the cathode connected to an external electrical load. Fuel is supplied to the anode tank and an oxidant to the cathode tank. Each electrode is a monolithic electrode, a composite electrode, or an internally coupled electrode having a catalyst surface. There may be an external reaction vessel for processing electrolyte before returning it to the tanks and conditioning and recycling of fuel. The impedance of the fuel cell is reduced substantially over fuel cells having an electrical path through the solution.

49 Claims, 5 Drawing Sheets fig 1   fig 2 fig 3 fig 4 fig 5 fig 6 fig 7 fig 8

NON DIFFUSION FUEL CELL AND A PROCESS OF USING THE FUEL CELL

FIELD OF INVENTION

This invention relates to electrical fuel cells.

BACKGROUND

The applicant has applied for a patent with Application Number PCT/AU97/00488 for a FUEL CELL AND A PROCESS OF USING A FUEL CELL under the Patent Cooperation Treaty. The patent was published on Feb. 12, 1998 with Publication Number WO 98/06145.

The above fuel cell consisted of a separate anode cell and a separate cathode cell with two electrodes in each cell adjacent to each other. Fuel is fed into the anode cell and oxidant is fed into the cathode cell. Ions produced in one cell are transported to the other cell to provide the ion transfer for the fuel cell reactions. The electronic circuit is completed through the load, the connection of the one electrode in the anode cell to another electrode in the cathode cell by an external conductor, and through the electrolyte between the adjacent electrodes at the anode cell and at the cathode cell.

This fuel cell eliminated the diffusion of ions through a media common to prevailing conventional fuel cells such as the proton electrolytic membrane fuel cell, the molten carbonate fuel cell, and the solid oxide fuel cell. The fuel cell not only reduced the high impedance common to conventional fuel cells but the simple and relatively low temperature of operation allowed for low cost construction of the fuel cell using available materials and hardware.

This simple fuel cell can be built in much larger sizes than conventional fuel cells.

PRIOR ART

The conventional fuel cells, namely the proton electrolytic membrane fuel cell, the molten carbonate fuel cell, and the solid oxide fuel cell and their operating principles were described in PCT/AU97/00488 and will not be repeated in this patent application. The fuel cell covered in PCT/AU97/00488 is a major improvement over conventional fuel cells; however, there is further room for improvement as the electronic circuit had to pass through the electrolyte between the adjacent electrodes at the anode cell and again at the cathode cell. While this impedance may not be as great as conventional fuel cells, it was desirable to remove this impedance if possible and make the electronic circuit independent of the conductivity of the electrolyte. It would then be possible to use less corrosive electrolytes and also the possibility of using gases to conduct the ions between the anode cell and the cathode cell. This feature would also result in a higher fuel cell efficiency and higher power density.

It is the object or one of the objects of this invention to provide such an improved fuel cell.

DESCRIPTION OF THE INVENTION

In one form therefore the invention is said to reside in a fuel cell comprising a separate anode cell and a separate cathode cell, the anode cell including an anode tank for containing an electrolyte and having an anode electrode immersed therein, means to supply electrolyte to the anode tank and means to supply fuel to the anode tank, the cathode cell including a cathode tank for containing the electrolyte and having a cathode electrode immersed therein, means to supply electrolyte to the cathode tank and means to supply an oxidant to the cathode tank, means to withdraw reacted electrolyte from the anode tank and to supply it to the cathode tank, means to withdraw reacted electrolyte from the cathode tank and supply it to the anode tank, each of the anode electrode and the cathode electrode having a central current collector and a coating of catalyst thereon, each of the anode electrode and the cathode electrode having a first end and a second end, means to connect the first end of the anode electrode and the first end of the cathode electrode to a first electrical load outside of the fuel cell, and means to connect the second end of the anode electrode to the second end of the cathode electrode to a second electronic load as part of a complete electrical circuit of the fuel cell.

In one embodiment the second electrical load may comprise an ionic or semiconductor membrane or a diode device.

Each of the anode electrode and cathode electrode may have a composite cubical or cylindrical construction comprising an outer conductor current collector or collectors and a catalyst coating applied to its or their surfaces and an inner current collector electrically connected to the two outer conductor current collectors through an ionic or semiconductor membrane wherein the outer conductor current collector or collectors comprise the first end of the respective electrode and the inner current collector comprises the second end of the respective electrode.

To achieve the highest power output from the fuel cell the electrical loads may be connected to either the outer conductor current collector or collectors or the inner current collector depending on the specific ionic reactions occurring at each electrode.

Alternatively the respective inner current collectors may be connected directly together with the ionic or semiconductor membranes between the respective inner current collectors and outer conductor current collector or collectors providing the second electrical load.

In another embodiment the anode tank and the cathode tank may be separated by a common wall and the central collector of the anode electrode and the cathode electrode partially or completely connected through the common wall by an ionic or semiconductor membrane or a diode device providing the second electrical load.

In one preferred embodiment the means to supply electrolyte to the anode tank comprises the means to withdraw electrolyte from the cathode tank and the means to supply electrolyte to the cathode tank comprises the means to withdraw electrolyte from the anode tank.

There may be further included a reaction tank and wherein the respective means to supply electrolyte to the anode tank and to the cathode tank comprises means to withdraw electrolyte from the reaction tank and the respective means to withdraw reacted electrolyte from the anode tank and from the cathode tank transfers reacted electrolyte to the reaction tank.

There may be further included means for recovering excess fuel from the reacted electrolyte discharged from the anode cell and a means of removing reaction products from the anode tank, the cathode tank, or the reaction tank.

The anode tank and the cathode tank may be constructed to provide an efficient contact between the electrolyte containing the fuel or oxidant and the electrodes immersed in the electrolyte.

The anode electrode and the cathode electrode may be made from a material selected from the group comprising solid, porous, fibre, gauze, tiny particles of various shapes, or woven cloth of metal or alloys of metals, carbon, vitreous carbon, conducting plastics material or a slurry comprising fine particles comprising catalyst or coated with catalyst fluidised in the respective tanks.

The anode electrode and the cathode electrode may be electroplated, sputtered or coated with the catalyst selected from platinum, nickel, cobalt, lithium, lanthanum, strontium, palladium, rhodium, yttrium, or any mixtures of these.

The liquid electrolyte may be selected from the group comprising acidic electrolytes including sulphuric acid, phosphoric acid, methane sulphonic acid, other organic and inorganic acids, alkaline electrolytes including sodium hydroxide, potassium hydroxide, molten electrolytes including lithium-potassium carbonate, and mixtures of electrolyte and colloids or fine solid catalyst or fine particles coated with catalyst being a catalyst for the anode reaction and the cathode reaction.

Characteristics of the electrolyte may be altered by the addition of modifiers either as ions or colloids such as surfactants and metal ions such as vanadium oxide.

The electrolyte may be a gas selected from the group comprising nitrogen, helium, argon, or mixtures of these gases and other gases such as carbon oxides.

The fuel may be selected from the group comprising hydrogen, natural and refined hydrocarbons such as methane, propane, butane, liquid hydrocarbons, methanol, ethanol and other alcohols, and natural and manufactured carbohydrates such as biomass gas.

When the fuel is a hydrocarbon there may be further included means of cracking the hydrocarbon fuel or means of forming hydrogen from hydrocarbon fuels before introducing the fuel into the anode tank.

Where the fuel is a hydrocarbon there may be further included means to condition the hydrocarbon fuel prior to direct feeding to the fuel cell, the means to condition selected from pyrolysis with or without catalysis, contacting with a catalyst, contacting with a super acid or zeolite, or subjecting the hydrocarbon fuel to electromagnetic energy.

The oxidant may be selected from the group comprising air, oxygen, oxygen-nitrogen mixtures, oxygen-carbon oxide mixtures, hydrogen peroxide, and potassium permanganate.

There may be further included means for intermittent injection of gaseous fuel or oxidant respectively into the anode or cathode tanks.

Also there may be further included means to heat or cool the anode tank, or the cathode tank, or the reaction tank to a selected temperature and means to raise and maintain the pressure in the anode tank, or the cathode tank, or the reaction tank to a selected pressure.

In an alternative embodiment the invention may reside in a battery of fuel cells comprising a plurality of fuel cells as discussed above wherein the anode electrodes and the cathode electrodes of adjacent cells are electrically connected in series or in parallel.

In an alternative embodiment the invention may reside in a fuel cell having of a separate anode cell and a separate cathode cell and a reaction tank wherein: the anode cell comprises an anode tank having an anode electrode immersed therein, the anode electrode being selected from a monolithic electrode, a composite electrode, or an internally coupled electrode, means to supply electrolyte to the anode tank from the reaction vessel, means to supply fuel in the form of gas, liquid, or solid mixed with the electrolyte being supplied to the anode tank, the cathode cell comprises a cathode tank having a cathode electrode immersed therein, the cathode electrode being selected from a monolithic electrode, a composite electrode, or an internally coupled electrode, means to supply electrolyte to the cathode tank from the reaction tank, means to supply air, oxygen, oxygen-nitrogen mixtures, or other oxidants mixed with the electrolyte to the cathode tank, means to withdraw reacted electrolyte from the anode tank and deliver to the reaction tank, means to withdraw reacted electrolyte from the cathode tank and deliver to the reaction tank, each of the anode electrode and the cathode electrode having a first end and a second end, means to connect the first end of the anode electrode and the first end of the cathode electrode to a first electrical load outside of the fuel cell, and means to connect the second end of the anode electrode to the second end of the cathode electrode to a second electrical load as part of a complete electrical circuit of the fuel cell.

In an alternative embodiment the invention may reside in continuous process for producing electric power and heat in a fuel cell from reacting a fuel in an anode tank and an oxidant in a cathode tank, the fuel cell having an anode electrode immersed in the electrolyte in the anode tank, and a cathode electrode immersed in the electrolyte in the cathode tank and the anode electrode and the cathode electrode connected to a first electrical load at one end thereof and connected a second electrical load at another end thereof, the process comprising the steps of; introducing the fuel with the electrolyte in the anode tank wherein a catalyst on the anode electrode in the anode tank causes a chemical reaction or ionises the fuel thereby which producing electrons, transferring the electrons through an external electrical circuit through the external electrical loads to the cathode electrode, introducing the oxidant mixed with the electrolyte into the cathode tank wherein a catalyst on the cathode electrode causes a chemical reaction or ionises the oxidant with the electrons from the anode, and completing the electronic circuit.

The ions produced at the anode electrode required for the reaction at the cathode electrode may be delivered continuously through the electrolyte and the ions produced at the cathode electrode required for reactions at the anode electrode may be delivered continuously through the electrolyte.

This embodiment of the invention may further include a step of transferring the electrolyte from the anode tank and from the cathode tank to a reaction tank and transferring the electrolyte from the reaction tank to the anode tank and to the cathode tank and wherein the ions produced at the anode electrode and the ions produced at the electrode cathode are delivered continuously through the electrolyte to a reaction tank.

This embodiment of the invention may further include the step of recycling excess fuel exiting from the anode tank.

This embodiment of the invention may further include the step of removing the reaction products such as water or carbon dioxide from the electrolyte in an evaporating tank, vacuum vessel, or an absorption vessel.

This embodiment of the invention may further include a step of injecting gaseous fuel to the anode in a cyclic manner and injecting gaseous oxidant into the cathode tank in a cyclic manner.

The anode tank, the cathode tank, and the reaction tank may be heated or cooled and pressurised.

The oxidant, the electrolyte and the fuel may be as discussed above.

The fuel may travels co-current or counter-current to the electrolyte in the anode tank and the oxidant travels co-current or counter-current to the electrolyte in the cathode tank.

There may be several anode electrodes of the same type in one anode tank and correspondingly several cathode electrodes of the same type in one cathode tank. These electrodes may be electrically connected singly or in groups in series or in parallel. The optimum electrical connection of the electrodes depends on the catalyst and the electrolyte used but should naturally result in the highest voltage or power production from the fuel cell.

The electrode shape may be cubical, cylindrical, tube like or any geometrical shape and the electrodes may be installed along the flow or across the flow of the electrolyte.

In terms of electrolyte flow, several anode tanks may be connected singly or in groups in series or in parallel to a corresponding number of cathode tanks.

There may be further means to vary the ratio of the fuel and oxidant to the electrolyte fed into the anode tank and to the cathode tank and an additional means to add gas fuels in cyclic amounts to the anode tank.

The monolithic anode electrode and the monolithic cathode electrode may be made from materials selected from the group solid, porous, fibre, gauze, or woven cloth of metal, carbon, graphite, vitreous carbon, fine vitreous carbon beads, conducting plastics material, or a slurry comprising catalyst or fine particles coated with catalyst fluidised in the respective anode tank and cathode tank.

The composite anode electrode and the composite cathode electrode may be made from the same material as the monolithic electrode. The semiconductor or ionic membrane between the electrodes should allow the flow of electrons only in one direction and may be made from a range of materials such as plastics, ceramics, oxides and crystals.

The monolithic and the composite anode electrode and cathode electrode may be coated with catalyst by using with conductive binders or electroplating or by sputtering with catalyst selected from platinum, nickel, cobalt, lithium, lanthanum, strontium, palladium, yttrium, or any mixtures of these materials and their compounds.

The gaseous electrolyte may be selected from gases such as nitrogen, helium, argon, and compounds containing carbon and or hydrogen or oxygen.

The electrolyte may contain activators and modifiers as ions or fine particles or coatings of fine particles such as oxides of vanadium, potassium, and modifiers such as ionic and non-ionic surfactants to improve the efficiency of the fuel cell.

The ions produced at the anode required for the cathode reaction are delivered continuously by the electrolyte to the cathode tank.

The order of reactions may be true for a combination of catalyst and electrolyte but the reactions may vary with other combinations of catalyst and electrolyte.

For instance in a fuel cell using hydrogen for fuel and oxygen for oxidant and concentrated phosphoric acid for electrolyte, the reactions are:

Anode Reaction $H_2 \rightarrow 2H(+) + 2e(-)$

Cathode Reaction $1/2 O_2 + 2H(+) + 2e(-) \rightarrow H_2O$

The fuel cell reactions using hydrogen for fuel and oxygen for oxidant in a concentrated potassium hydroxide electrolyte are:

Anode Reaction $H_2 + 2OH(-) \rightarrow 2H_2O + 2e(-)$

Cathode Reaction $1/2 O_2 + H_2O + 2e(-) \rightarrow 2OH(-)$

There may be further included the step of removing the fuel cell reaction products such as water and carbon dioxide from the reacted electrolyte in an evaporating vessel, a vacuum vessel, or an absorption vessel.

The process may be carried out in pressures from sub-atmospheric to 5,000 pounds per square inch and at temperatures from sub-zero temperatures to 1200° C.

Heat produced from the fuel cell reaction may be may be recovered for co-generation, industrial heating, and domestic heating.

The fuel may travel co-current or counter-current to the electrolyte in the anode tank and the oxidant may travel co-current or counter-current to the electrolyte in the cathode tank.

Hence it will be seen that this invention is a chemico-electrical process to collect the electrical power and heat from the reaction of the fuel and oxidant. The process is carried out in a separate anode cell where fuel and electrolyte is introduced and a separate cathode cell where the oxidant and electrolyte is introduced. A complete electrical circuit is established between the anode electrode, the external electrical load, and the cathode electrode. Ion transport within the fuel cell is accomplished by circulating the liquid or gas electrolyte between the anode cell and the cathode cell.

BRIEF DESCRIPTION OF THE DRAWINGS

This generally describes the invention but to assist with understanding of the invention reference will now be made to preferred embodiments of the invention as illustrated in the following drawings and experimental work carried out with experimental fuel cells according to the invention.

In the drawings.

Figure 1:
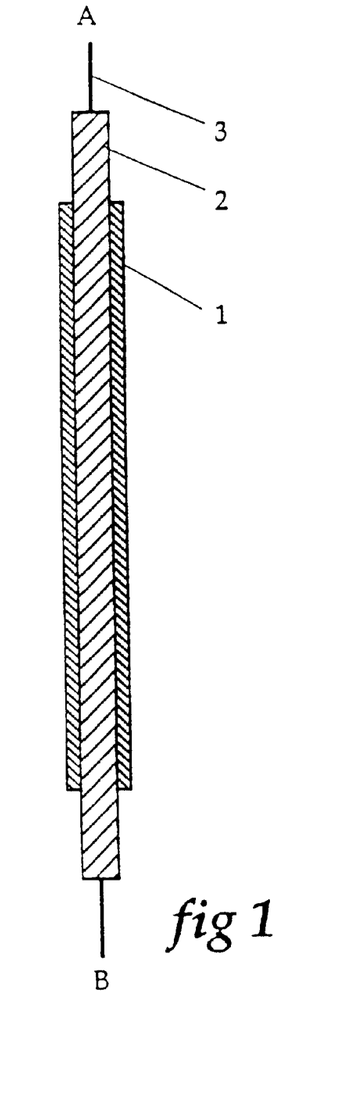
FIG. 1 shows a cross sectional view of a monolithic electrode according to one embodiment of the invention.

Now looking more closely at the drawings and referring to FIG. 1, it will be seen that in cross section the monolithic electrode is constructed of a catalyst coating 1 connected to a current collector 2 and the current produced is conducted by copper wire 3. The current collector 2 extends beyond each end of the catalyst coating 1 and copper wire 3 extends from each end of the current collector 2 and may be connected to an electrical load.

Figure 2:
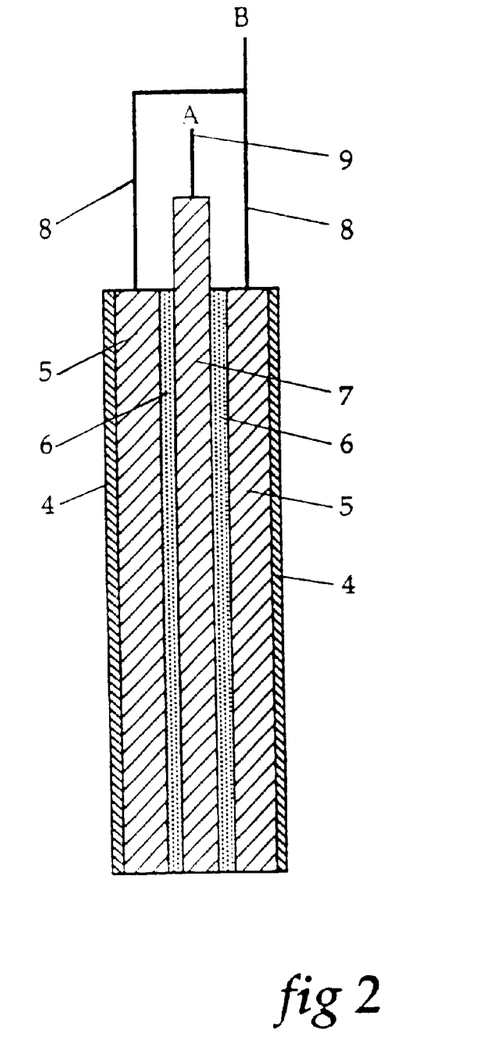
FIG. 2 shows a cross sectional view of a composite electrode according to an alternative embodiment of the invention.

In FIG. 2, it will be seen that in cross section the composite electrode is made up of a catalyst coating 4 connected to a current collector 5 which conducts the electrons produced or required by the fuel cell reaction at the catalyst coating. The copper wire 8 conducts the electrons to the outer circuit. The central conductor 7 provide the means to complete the electronic circuit and is connected to conductor 5 by means of ionic or semiconductor membrane 6. This type of electrode is used at both the anode and the cathode in place of the monolithic electrode. The external electrical connection may vary depending on the catalyst and the electrolyte, for instance, 9 of the composite anode electrode may be connected to 9 of the composite cathode electrode and the electrical load connected between 8 of the composite anode electrode and 8 of the composite cathode electrode.

Figure 3:
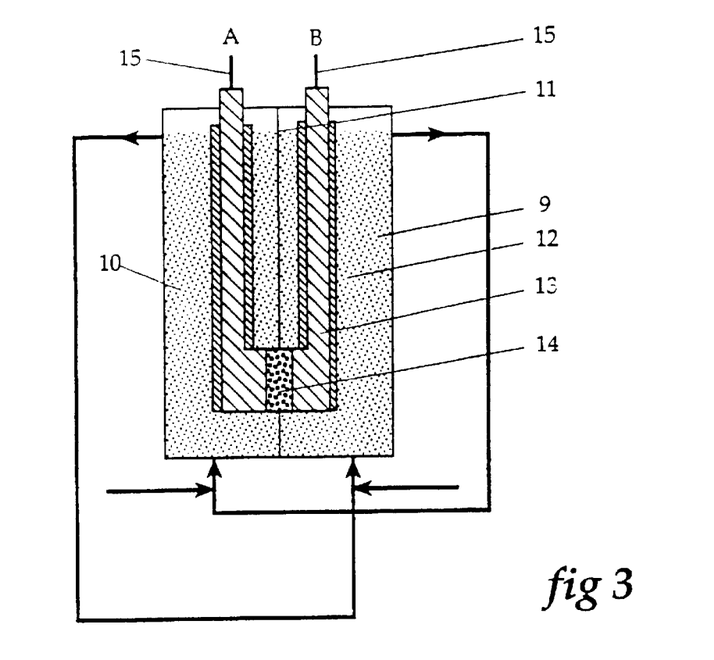
FIG. 3 shows a schematic view of a fuel cell with internally coupled electrodes according to one embodiment of the invention.

In FIG. 3 it will be seen in cross section that internally coupled electrodes are installed in a fuel cell. The anode tank 10 and cathode tank 9 have an anode and cathode respectively and are separated by a wall 11. The catalyst coating 12 may be different for each electrode. The current collectors 13 are connected through the wall 11 by an ionic or semiconductor membrane 14. The electronic circuit is completed by connecting the terminals 15 to the electrical load. The ionic membrane connection may occupy part or all of the length of the current collectors 13. There may be several sets of the composite electrodes in one fuel cell connected in series or parallel.

Figure 4:
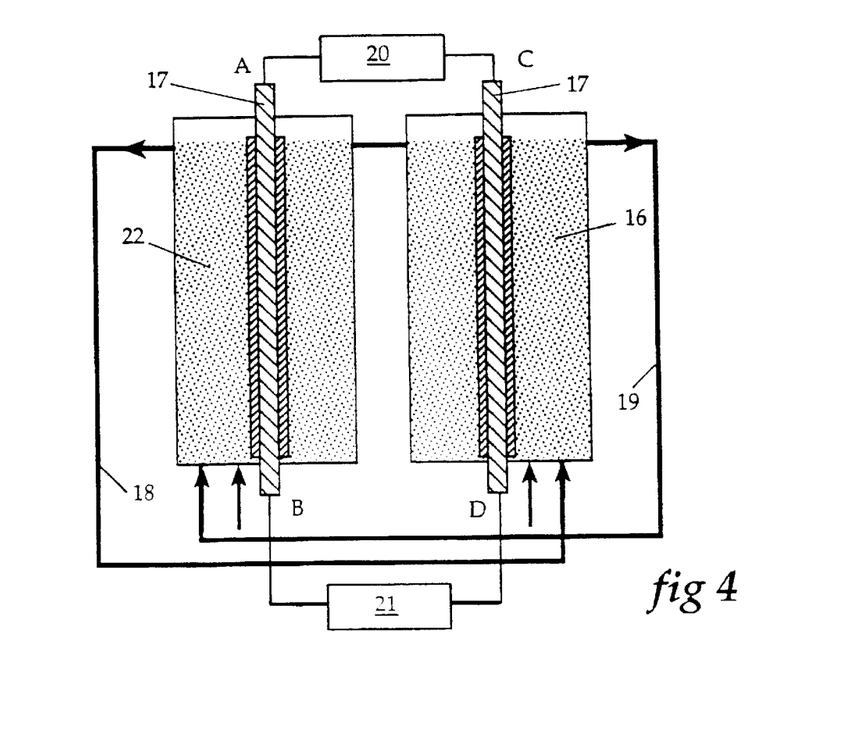
FIG. 4 shows a schematic view of a fuel cell with series flow of electrolyte according to an alternative embodiment of the invention.

The series fuel cell in FIG. 4 shows a separate anode cell 22 and a separate cathode cell 16 each containing an electrode 17. This electrode 17 may either be a monolithic or composite electrode. The electrons produced at or consumed at the catalyst surface of the electrodes are conducted through the electrical loads 20 and 21. The ions produced at the anode cell 22 are transported by the electrolyte by stream 18 while the reacted electrolyte is returned from the cathode cell 16 to the anode cell 22 by stream 19. This arrangement provides a continuous system for the fuel cell. For simplicity of this diagram, auxiliaries such as means to remove excess fuel from the anode and recycle this to the anode fuel feed and the means to remove reaction products from the electrolyte stream are not shown in FIG. 4.

Figure 5:
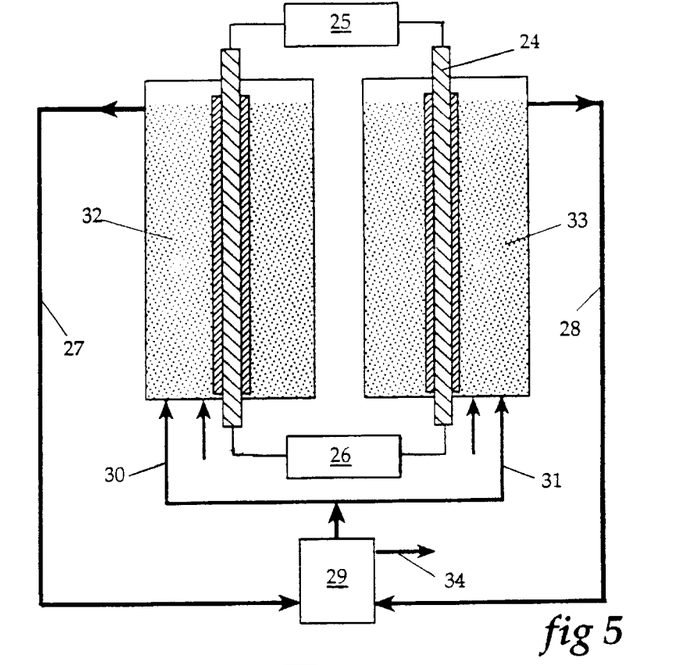
FIG. 5 shows a schematic view of a fuel cell with parallel flow of electrolyte according to an alternative embodiment of the invention.

The parallel fuel cell shown on FIG. 5 shows a separate anode cell 32 and a separate cathode cell 33 containing respective electrodes 24. The electrons generated at the anode electrode are conducted to the electrical loads 25 and 26. The ions produced by the anode reactions are conveyed continuously by stream 27 to the reaction tank 29. Similarly, stream 28 conveys continuously the ions produced in the cathode reaction to reaction tank 29. The ions react in the reaction tank 29 and the neutralised electrolyte is returned to the anode cell by stream 30 and to the cathode cell by stream 31. An advantage of this parallel arrangement is that heat from the fuel cell reaction would be more convenient to apply to co-generation. Excess reactants and by-products may be removed from reaction tank 29 in stream 34.

Figure 6:
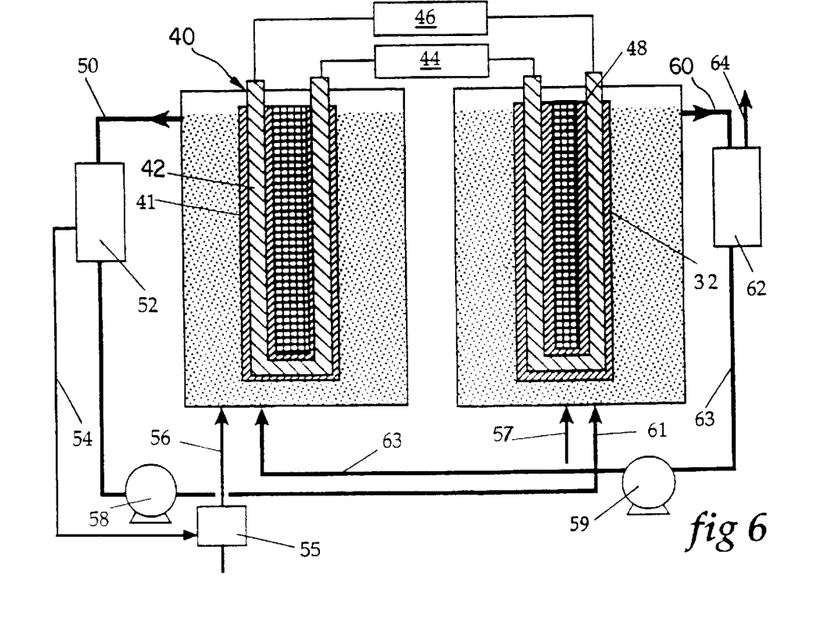
FIG. 6 shows a schematic view of a fuel cell incorporating U-shaped monolithic electrodes shaped to provide an electrical connection only to the dry end of the anode and cathode tank.

FIG. 6 shows a U-shaped monolithic electrode 40 installed in a series type fuel cell. The catalyst coating 41 and the current collector 42 are U-shaped to allow the external electrical connections to the electrical loads 44 and 46 to be on the gas side of the fuel cell tank. Insulation or a baffle 48 may be required between the catalyst coating depending on the gap and the nature of the electrolyte and the catalyst. Fuel is fed in by line 56 to the anode cell and oxidant is fed in line 57 to the cathode tank. Pump 58 provides the means to cycle electrolyte from the anode tank to the cathode tank through line 61 and pump 59 provides the means to cycle electrolyte from the cathode tank to the anode tank through line 63.

Unreacted fuel and reacted electrolyte is removed from the anode cell through line 50 and to separator 52. In the separator 52 unreacted fuel is removed from the stream and recycled in line 54 to fuel conditioner 55. In fuel conditioner 55 new fuel and recycled fuel is modified processes such as pyrolysis with or without catalysis, contacting with a catalyst, contacting with a super acid or zeolite, or subjecting the hydrocarbon fuel to electromagnetic energy and then the conditioned fuels is fed into the anode cell by fuel inlet 56. Excess oxidant, electrolyte and waste products are removed in line 60 from the cathode tank and separated in separator 62 with electrolyte being returned to the cathode tank and waste and oxidant be removed in line 64

Figure 7:
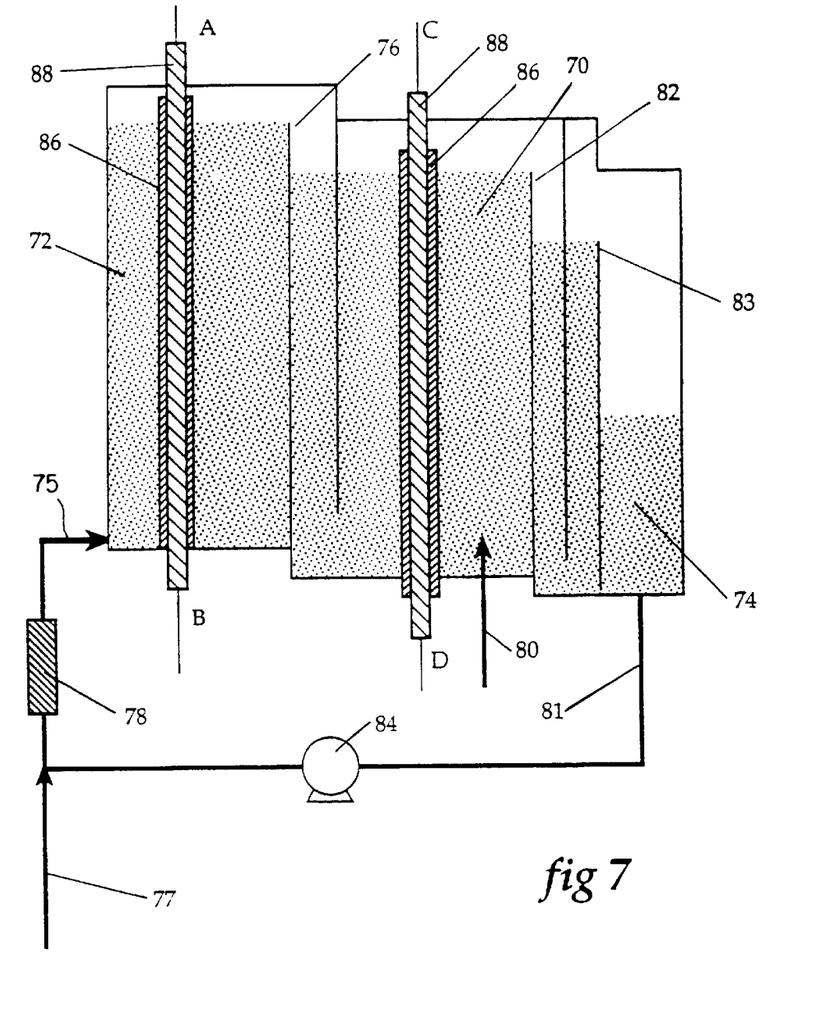
FIG. 7 is a diagram showing the experimental series flow apparatus built to develop this invention.

FIG. 7 is a schematic diagram of the series type fuel cell test apparatus.

The fuel cell has an anode tank 70 and a cathode tank 72 and a sump 74. Electrolyte flows by gravity from the cathode tank 72 over weir 76 to the anode tank 70. Electrolyte then flows by gravity from the anode tank 70 over weirs 82 and 83 to the sump 74. From there electrolyte is removed in line 81 and pumped by pump 84 to the cathode tank 72. Oxygen is introduced through line 77 to a pipe mixer 78 and then transferred by line 75 to the cathode tank 72 while hydrogen is introduced to the anode tank 70 through line 80. The electrodes are constructed with a carbon cloth surface painted with a mixture of black platinum and an organic binder 86 as the catalyst and are connected to an expanded metal niobium coated with platinum current collector 88. The electrolyte used was 40% KOH in aqueous solution. This apparatus produced only a low power density but was adequate to demonstrate the operating principle of the fuel cell.

Figure 8:
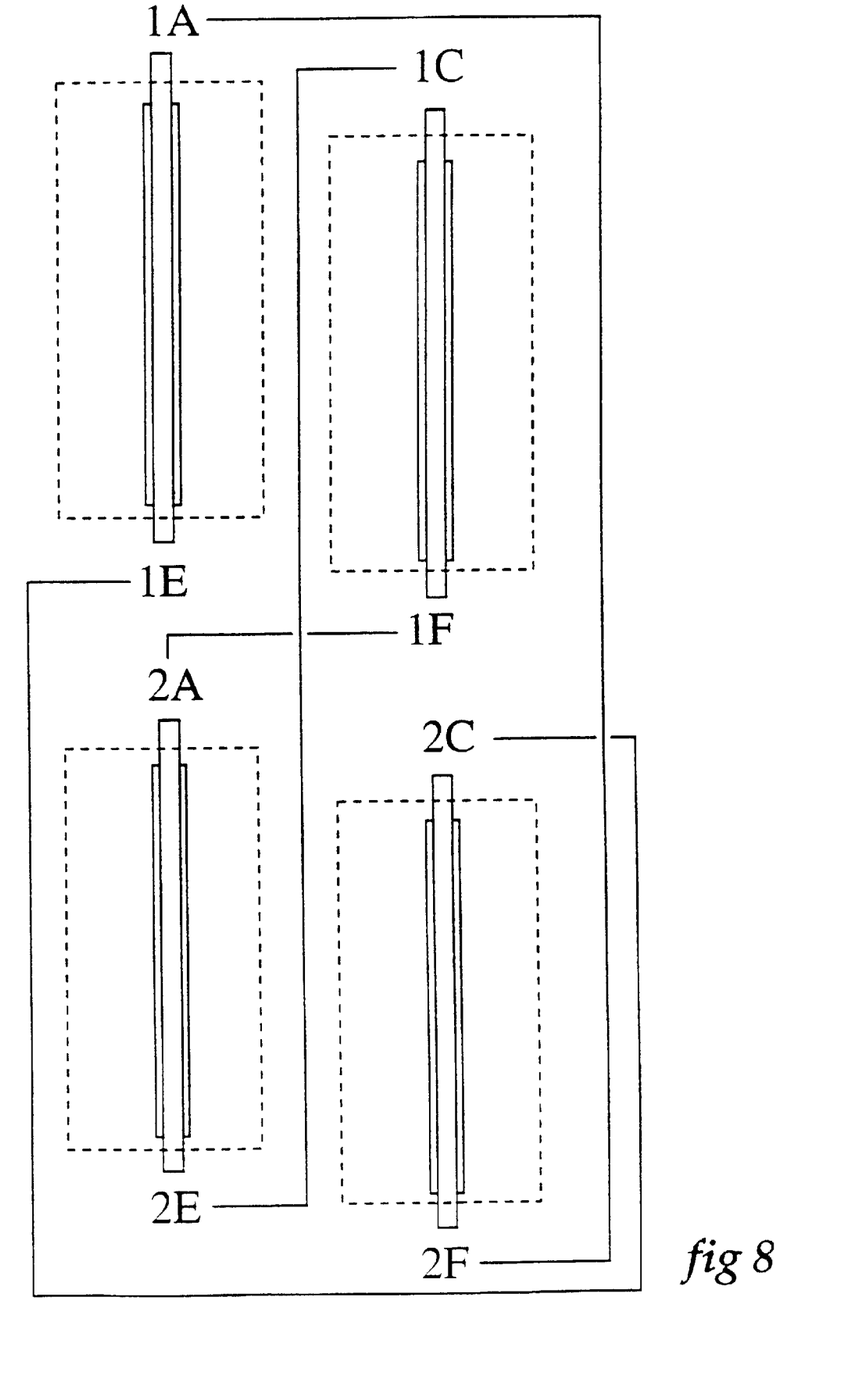
FIG. 8 is a diagram showing one manner of stacking or series connection of two fuel cells according to this invention based on experimental results.

A diagram showing one method of stacking two fuel cells is shown on FIG. 8. The stacking shows the total voltage is equal to the sum of the voltage generated from each fuel cell. As discussed previously, other stacking connections are possible and may prove more appropriate when fuel cells of higher power density are used.

Experimental Data

A diagram of the large scale laboratory apparatus built to develop this invention is shown on FIG. 7. Testing was carried out at atmospheric pressure and the cell and gas mixer were provided with electric heaters to heat the electrolyte.

The electrodes are commercially available and consist of an expanded metal niobium coated with platinum current collector sandwiched between carbon cloth. The carbon cloth was coated with a mixture of an organic binder and platinum black at a loading of about 0.5 mg/cm2. Copper wires were welded to the niobium current collector at both ends of the electrode and then coated with epoxy. The electrode measured about 50 mm×200 mm×1.9 mm thick.

The fuel cell tanks were made from 6 mm thick polypropylene sheet. The electrolyte used was 40 percent (w/w) potassium hydroxide and was circulated at the rate of about 1,200 mls per minute by a Masterflex Easy Load tube pump. Oxygen flow rate to the cathode tank was 78 mls per minute while the hydrogen feed rate at the anode tank was 100 mls per minute. Due to the low power output of the electrodes, the resistance of the voltmeters of about 8 to 10 megaohms (METEX Model M-3850-D and Dick Smith Q-1570) were used as the electrical load in the experiments.

Referring to FIG. 7, when a copper wire which has practically no resistance connects (B) to (D), the voltage between (A) and (C) is zero. Likewise, the voltage of the cell is zero when (B) is connected to (C); or (A) to (D); or (A) to (C). This suggests that the electrodes are being short-circuited and the power is drained completely.

At 25° C., when the voltmeter was connected between (A) and (C) and another voltmeter was connected between (B) and (D), the voltmeter readings were:

(A) to (C)=542 millivolts (B) to (D)=542 millivolts

A similar voltage is generated between a copper wire connecting (A) to (B) and a copper wire connecting (C) to (D). This observation may allow a single electrical load to be connected to this fuel cell when using the monolithic electrodes.

When the current meter which has a resistance of about 3 ohms was connected across (A) and (C), the current stabilised at 19.2 milliamperes and 29 millivolts.

At 31 degrees Celsius electrolyte temperature, the readings of the voltages were:

(A) to (C)=260 millivolts (B) to (D)=260 millivolts

With the experiments carried out at atmospheric pressure, it is believed that the solubility of the gases reduced with higher temperature resulting in reduced power output of the fuel cell. This indicates the importance of pressure on the power output of the fuel cell.

This arrangement of electrodes and electrolytes produced fuel cell type reactions. It is possible to include the other concepts of electrode constructions such as the composite electrode based on these experimental results. The single electrical load to the fuel cell may be attained by using conventional means such as incorporating a diode or similar device in the electrical circuit, or this problem may be resolved in the series connection or stacking of the fuel cells.

The most important result of these experiment is that the fuel cell concept generated fuel type reactions in a continuous system.

The "stacking" or series connection of fuel cells to obtain working voltages for commercial applications is critical for any fuel cell proposal. Two identical series type fuel cells using the best of the remaining platinum electrodes were constructed using the same pumping arrangements. FIG. 8 is a schematic diagram of the electrode connections.

At 24 degrees Celsius and using 40% potassium hydroxide electrolyte, hydrogen fuel, and oxygen as oxidant, the voltages obtained were:

Cell 1 (1A) to (1C)=609 millivolts

Cell 2 (2A) to (2C)=926 millivolts

Total Voltage=1,535 millivolts

It is believed that the contact between the catalyst layer and the niobium collector is being degraded by the electrolyte based on observation of the electrodes. This would explain the difference in voltage produced by Cell 1 and Cell 2.

When (1C) is connected to (2E) and (2A) is connected to (1F), the voltage measured between:

(1E) and (2C)=1,534 millivolts, and (1A) and (2F)=1.523 millivolts

The experiment confirms that the fuel cell of this invention can be stacked to produce higher working voltages.

Other series connections were trialed during the experiment but produced lower voltages. For instance, connecting 1C to 2F; 1A to 2E; and 1F to 2A produced a voltage of 1,369 millivolts between 1E and 2C. It is possible that when higher power densities are used in this fuel cell that the optimum stacking connection may be different to that shown on FIG. 8.

Throughout this specification and the claims that follow unless the context requires otherwise the terms "comprise" and "include" and variations such as "comprising" and "including", will be understood to imply the inclusion of a stated integer or group of integers but not to the exclusion of any other integer or group of integers.

What is claimed is:

1. A fuel cell comprising a separate anode cell and a separate cathode cell, the anode cell including an anode tank for containing an electrolyte and having an anode electrode immersed therein, means to supply electrolyte to the anode tank and means to supply fuel to the anode tank, the cathode cell including a cathode tank for containing the electrolyte and having an cathode electrode immersed therein, means to supply electrolyte to the cathode tank and means to supply an oxidant to the cathode tank, means to withdraw reacted electrolyte from the anode tank and to supply it to the cathode tank, means to withdraw reacted electrolyte from the cathode tank and to supply it to the anode tank, each of the anode electrode and the cathode electrode having a central current collector and a coating of catalyst thereon, each of the anode electrode and the cathode electrode having a first end and a second end, means to connect the first end of the anode electrode and the first end of the cathode electrode to a first electrical load outside of the fuel cell, and means to connect the second end of the anode electrode and the second end of the cathode electrode to a second electrical load.

2. A fuel cell as in claim 1 wherein the second electrical load comprises a semiconductor membrane or a diode.

3. A fuel cell as in claim 1 wherein each of the anode electrode and cathode electrode have a composite cubical or cylindrical construction comprising an outer conductor current collector or collectors and a catalyst coating applied to its or their surfaces and an inner current collector electrically connected to the two outer conductor current collectors through an ionic or semiconductor membrane wherein the outer conductor current collector or collectors comprise the first end of the respective electrode and the inner current collector comprises the second end of the respective electrode.

4. A fuel cell as in claim 1 wherein the anode tank and the cathode tank are separated by a common wall and the central collectors of the anode electrode and the cathode electrode are partially or completely connected through the common wall by an ionic or semiconductor membrane or a diode.

5. A fuel cell as on claim 1 wherein the means to supply electrolyte to the anode tank comprises the means to withdraw electrolyte from the cathode tank.

6. A fuel cell as on claim 1 wherein the means to supply electrolyte to the cathode tank comprises the means to withdraw electrolyte from the anode tank.

7. A fuel cell as in claim 1 further including a reaction tank and wherein the respective means to supply electrolyte to the anode tank and to the cathode tank comprise means to withdraw electrolyte from the reaction tank and the means to withdraw reacted electrolyte from the anode tank transfers reacted electrolyte to the reaction tank and the means to withdraw reacted electrolyte from the cathode tank transfers reacted electrolyte to the reaction tank.

8. A fuel cell as on claim 1 further including means for recovering excess fuel from the reacted electrolyte discharged from the anode cell.

9. A fuel cell as in claim 1 further including a means of removing reaction products from the anode tank, the cathode tank, or the reaction tank.

10. A fuel cell as in claim 1 further including means to raise and maintain the pressure in the anode tank, the cathode tank, or the reaction tank to a predetermined pressure.

11. A battery of fuel cells comprising a plurality of fuel cells as in claim 1 wherein the anode electrodes and the cathode electrodes of adjacent cells are electrically connected in series or in parallel.

12. A fuel cell as in claim 1 wherein the anode electrode and the cathode electrode are electroplated, sputtered or coated with a catalyst selected from the group consisting of platinum, nickel, cobalt, lithium, lanthanum, strontium, palladium, rhodium, yttrium, and mixtures thereof.

13. A fuel cell as in claim 1 wherein the electrolyte is a liquid electrolyte selected from the group consisting of acidic electrolytes, alkaline electrolytes, molten electrolytes.

14. A fuel cell as in claim 1 wherein the electrolyte includes modifiers in the form of ions or colloids, said modifiers being selected from the group consisting of surfactants and metal ions.

15. A fuel cell as in claim 1 further including means to heat or cool the anode tank, the cathode tank, or the reaction tank to a predetermined temperature.

16. A fuel cell as in claim 1 wherein the fuel is selected from the group consisting of hydrogen, natural and refined gaseous hydrocarbons, liquid hydrocarbons, alcohols, and natural and manufactured carbohydrates.

17. A fuel cell as in claim 1 wherein the fuel is a hydrocarbon and further including means of cracking the hydrocarbon fuel or means of forming hydrogen from hydrocarbon fuels before introducing the fuel into the anode tank.

18. A fuel cell as in claim 1 wherein the fuel is a hydrocarbon and further including means to treat the hydrocarbon fuel prior to direct feeding to the fuel cell, the means to treat the hydrocarbon fuel being pyrolysis with or without catalysis, contacting with a catalyst, contacting with a super acid or zeolite.

19. A fuel cell as in claim 1 wherein the oxidant is selected from the group consisting of air, oxygen, oxygen-nitrogen mixtures, oxygen-carbon oxide mixtures, hydrogen peroxide, and potassium permanganate.

20. A fuel cell as in claim 1 further providing means for intermittent injection of a gaseous fuel oxidant respectively into the anode or cathode tanks.

21. A fuel cell as in claim 15 wherein said predetermined temperature is from sub-zero temperatures to 1200° C.

22. A fuel cell as in claim 15 wherein said predetermined pressure is from sub-atmospheric to 5000 pounds per square inch.

23. A fuel cell as in claim 13 wherein the acidic electrolyte is selected from the group consisting of sulphuric acid, phosphoric acid, and methane sulphonic acid, the alkaline electrolyte is selected from the group consisting of sodium hydroxide and potassium hydroxide, and the molten electrolyte is lithium-potassium carbonate.

24. A fuel cell as in claim 14 wherein the metal ion is vanadium oxide.

25. A fuel cell as in claim 16 wherein the natural and refined gaseous hydrocarbon is selected from the group consisting of methane, ethane, propane, and butane, the alcohol is selected from the group consisting of methanol and ethanol, and the natural and manufactured carbohydrate is biomass gas.

26. A fuel cell having a separate anode cell and a separate cathode cell and a reaction vessel wherein:
the anode cell comprises an anode tank having an anode electrode immersed therein,
the anode electrode is selected from a monolithic electrode, a composite electrode, or an internally coupled electrode,
the fuel cell further comprises means to supply electrolyte to the anode tank from the reaction vessel,
the fuel cell further comprises means to supply fuel in the form of gas, liquid, or solid mixed with the electrolyte being supplied to the anode tank,
the cathode cell comprises a cathode tank having a cathode electrode immersed therein,
the cathode electrode is selected from a monolithic electrode, a composite electrode, or an internally coupled electrode,
the fuel cell further comprises means to supply electrolyte to the cathode tank from the reaction vessel,
the fuel cell further comprises means to supply air, oxygen, or oxygen-nitrogen mixtures, mixed with the electrolyte to the cathode tank,
the fuel cell further comprises means to withdraw reacted electrolyte from the anode tank and deliver to the reaction vessel,
the fuel cell further comprises means to withdraw reacted electrolyte from the cathode tank and deliver to the reaction vessel,
each of the anode electrode and the cathode electrode has a first end and a second end,
the fuel cell further comprises means to connect the first end of the anode electrode and the first end of the cathode electrode to a first electrical load outside of the fuel cell, and
the fuel cell further comprises means to connect the second end of the anode electrode and the second end of the cathode electrode to a second electrical load.

27. A fuel cell as in claim 26 wherein the anode tank and the cathode tank are separated by a common wall and the central collector of the anode electrode and the cathode electrode are partially or completely connected through the common wall by an ionic or semiconductor membrane or a diode.

28. A fuel cell as in claim 26 wherein the second electrical load comprises semiconductor membrane or a diode.

29. A fuel cell as in claim 26 wherein each of the anode electrode and cathode electrode have a composite cubical or cylindrical construction comprising an outer conductor current collector or collectors and a catalyst coating applied to its or their surfaces and an inner current collector electrically connected to the two outer conductor current collectors through an ionic or semiconductor membrane wherein the outer conductor current collector or collectors comprise the first end of the respective electrode and the inner current collector comprises the second end of the respective electrode.

30. A continuous process for producing electric power and heat in a fuel cell from reacting a fuel in an anode tank and an oxidant in a cathode tank, the fuel cell having an anode electrode immersed in an electrolyte in the anode tank and a cathode electrode immersed in an electrolyte in the cathode tank, and the anode electrode and the cathode electrode connected to a first electrical load at one end thereof and connected to a second electrical load at another end thereof, the process comprising:
introducing the fuel with the electrolyte in the anode tank wherein a catalyst on the anode electrode in the anode tank causes a chemical reaction or ionizes the fuel thereby which produces electrons,
transferring the electrons through an external electrical load to the cathode electrode,
introducing the oxidant mixed with the electrolyte into the cathode tank wherein a catalyst on the cathode electrode causes a chemical reaction or ionizes the oxidant with the electrons from the anode, and connecting the anode electrode and the cathode electrode to a second electrical load.

31. A process as in claim 30 wherein the anode tank and the cathode tank are separated by a common wall and the central collector of the anode electrode and the cathode electrode are partially or completely connected through the common wall by an ionic or semiconductor membrane or a diode.

32. The process as in claim 30 wherein ions produced at the anode electrode required for the reaction at the cathode electrode are delivered continuously through the electrolyte.

33. The process as in claim 30 wherein ions produced at the cathode electrode required for reactions at the anode electrode are delivered continuously through the electrolyte.

34. The process as in claim 30 further including a step of transferring the electrolyte from the anode tank and from the cathode tank to a reaction tank and transferring the electrolyte from the reaction tank to the anode tank and to the cathode tank and wherein the ions produced at the anode electrode and the ions produced at the electrode cathode are delivered continuously through the electrolyte to a reaction tank.

35. The process as in claim 30 further including the step of recycling excess fuel exiting from the anode tank.

36. The process as in claim 30 further including the step of removing reaction products from the electrolyte in an evaporating tank, vacuum vessel, or an absorption vessel.

37. The process as in claim 30 further including a step of injecting gaseous fuel to the anode in a cyclic manner and injecting gaseous oxidant into the cathode tank in a cyclic manner.

38. The process as in claim 30 where the anode tank, the cathode tank, and the reaction tank are heated or cooled.

39. The process as in claim 30 where the anode tank, the cathode tank, and the reaction tank are pressurised.

40. The process as in claim 30 wherein the oxidant is selected from the group consisting of air, oxygen, oxygen-nitrogen mixtures, oxygen-carbon oxide mixtures, hydrogen peroxide, and potassium permanganate.

41. The process as in claim 30 wherein the fuel is selected from the group consisting of hydrogen, natural and refined gaseous hydrocarbons, liquid hydrocarbons, coal, alcohols, and natural and manufactured carbohydrates.

42. The process as in claim 41 where the fuel is a hydrocarbon fuel and the hydrocarbon fuel is subjected to pyrolysis, contact with super acid or zeolite, cracking, gasification, or water-gas reaction to produce hydrogen gas which is fed as fuel to the fuel cell.

43. The process as in claim 30 wherein the fuel travels co-current or counter-current to the electrolyte in the anode tank and the oxidant travels co-current or counter-current to the electrolyte in the cathode tank.

44. The process as in claim 30 wherein the electrolyte is a liquid electrolyte selected from the group consisting of acidic electrolytes, alkaline electrolytes, molten electrolytes.

45. The process as in claim 41 wherein the natural and refined gaseous hydrocarbon is selected from the group consisting of methane, ethane, propane, and butane, the alcohol is selected from the group consisting of methanol and ethanol, and the natural and manufactured carbohydrate is biomass gas.

46. The process as in claim 44 wherein the acidic electrolyte is selected from the group consisting of sulphuric acid, phosphoric acid, and methane sulphonic acid, the alkaline electrolyte is selected from the group consisting of sodium hydroxide and potassium hydroxide, and the molten electrolyte is lithium-potassium carbonate.

47. The process as in claim 36 wherein the reaction product is water or carbon dioxide.

48. A fuel cell as in claim 30 wherein the second electrical load comprises semiconductor membrane or a diode.

49. A process as in claim 30 wherein each of the anode electrode and cathode electrode have a composite cubical or cylindrical construction comprising an outer conductor current collector or collectors and a catalyst coating applied to its or their surfaces and an inner current collector electrically connected to the two outer conductor current collectors through an ionic or semiconductor membrane wherein the outer conductor current collector or collectors are connected to the electrical load and the inner current collector of the respective electrodes are connected to complete the electronic circuit.

* * * * *